B. FRIEDMAN.
AUTOMATIC GAS CUT-OFF.
APPLICATION FILED NOV. 14, 1913.

1,129,475.

Patented Feb. 23, 1915.

2 SHEETS—SHEET 1.

Witnesses
W. C. Fielding
Henry T. Bright

Inventor
B. Friedman,
By Chandlee & Chandlee
Attorneys

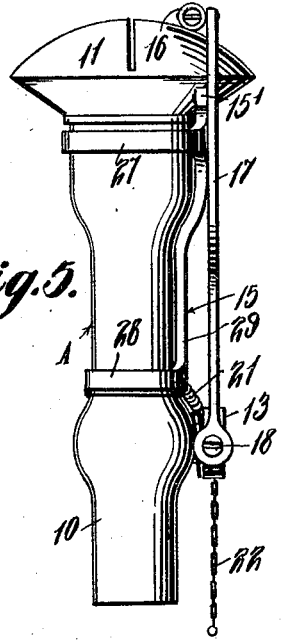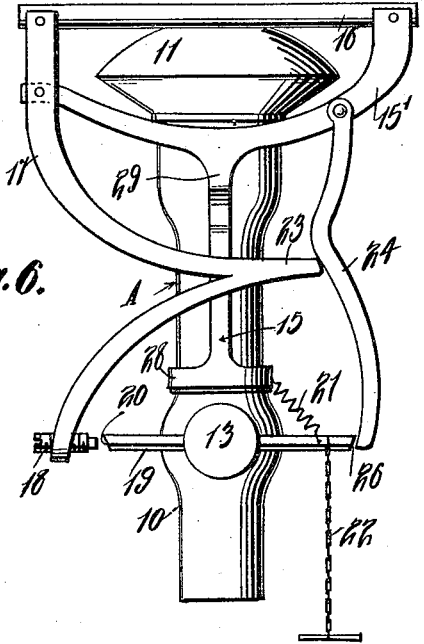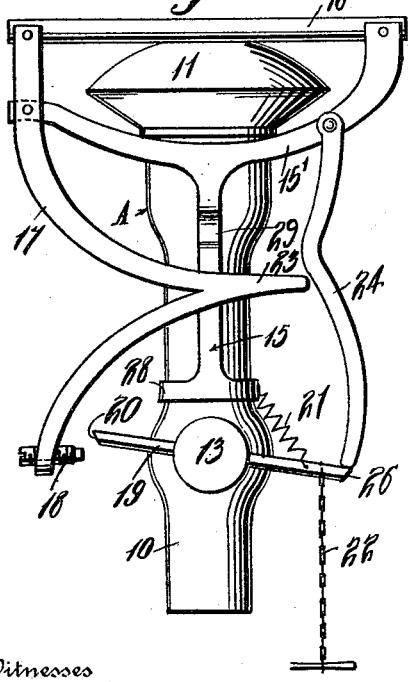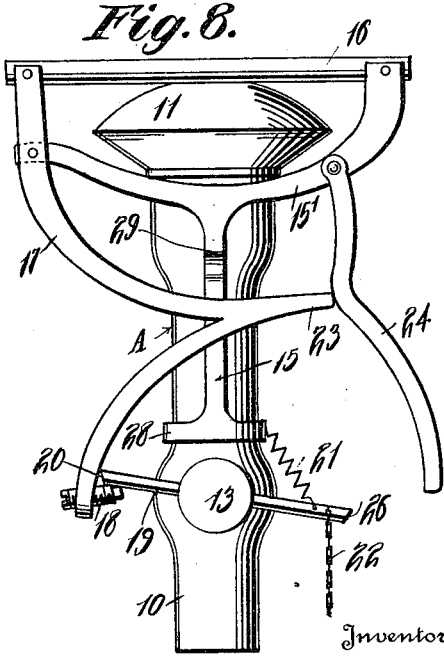

UNITED STATES PATENT OFFICE.

BERNARD FRIEDMAN, OF TRENTON, NEW JERSEY, ASSIGNOR, BY DIRECT AND MESNE ASSIGNMENTS, OF ONE-SIXTH TO WILLIAM S. SPIVACK, ONE-SIXTH TO RICHARD KRAMAROFF, ONE-SIXTH TO NATHAN KRAMAROFF, AND ONE-HALF TO ABRAHAM GARBEIL, ALL OF PHILADELPHIA, PENNSYLVANIA.

AUTOMATIC GAS CUT-OFF.

1,129,475. Specification of Letters Patent. Patented Feb. 23, 1915.

Application filed November 14, 1913. Serial No. 800,899.

*To all whom it may concern:*

Be it known that I, BERNARD FRIEDMAN, a subject of the Czar of Russia, residing at Trenton, in the county of Mercer, State of New Jersey, have invented certain new and useful Improvements in Automatic Gas Cut-Offs; and I do hereby declare the following to be a full, clear, and exact description of the invention, such as will enable others skilled in the art to which it appertains to make and use the same.

This invention relates to automatic gas cut offs.

The object of the invention resides in the provision of a gas cut off adapted for use in connection with a gas burner of any type and which will be automatically operated to cut off the flow of gas in the event the flame of the burner should be extinguished previous to cutting off the gas.

A further object of the invention resides in the provision of an automatic gas cut off which will be simple in construction, efficient and reliable in use, and which may be manufactured and installed at a comparatively small cost.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1:
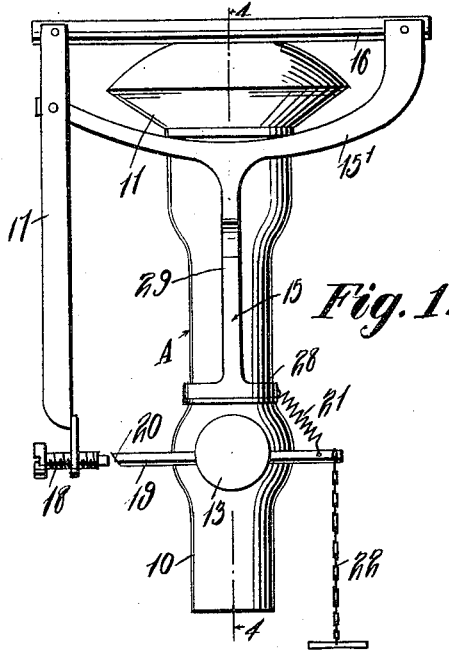
Figure 2:
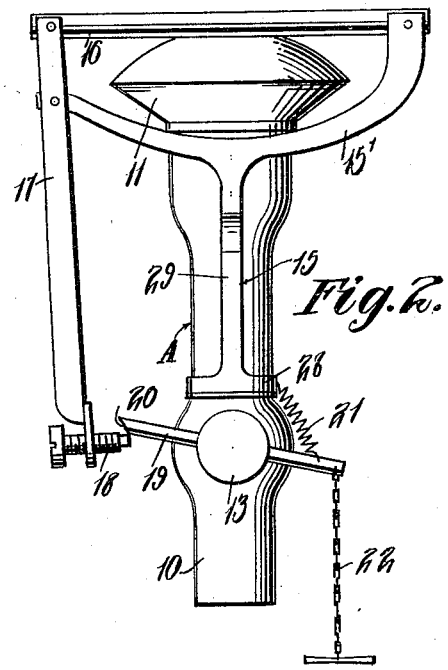
Figure 3:
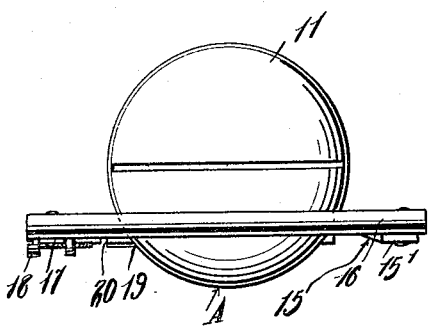
Figure 4:
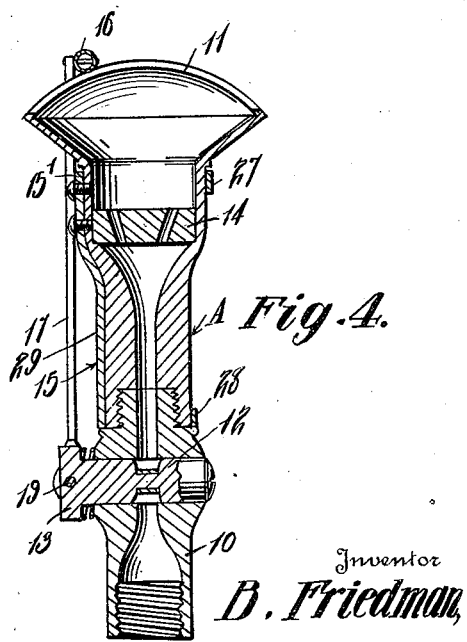

Figure 1 is a side elevation of a gas burner equipped with the improved automatic cut off, the parts of the cut off being shown in the position they would occupy before lighting the burner; Fig. 2, a view similar to Fig. 1 showing the position of the parts after the burner has been lighted a predetermined time; Fig. 3, a plan view of what is shown in Fig. 1; Fig. 4, a section on the line 4—4 of Fig. 1; Fig. 5, a view looking at the left hand side of Fig. 1; Fig. 6, a side elevation of a modified form of the invention with the parts in the position they would occupy before the burner is lighted; Fig. 7, a view similar to Fig. 6 with the parts in the position they would occupy just after the gas has been turned on and the burner lighted, and Fig. 8, a view similar to Fig. 6 with the parts in the position they would occupy after the burner has been lighted a sufficient length of time to effect the full expansion of the expansion bar.

Referring to the drawing A indicates an illuminating gas burner which comprises a tubular body portion 10 and a tip 11. The flow of gas through the bore of the body portion 10 to the tip 11 is controlled by a valve 12 mounted in the body 10 and having an extended stem 13. Also mounted in the bore of the body 10 is the usual guard 14 which serves to regulate and properly deliver the gas to the tip 11. Mounted upon the body 10 is a bracket 15 having an approximately U-shape portion 15'. Secured to one end of the U-shaped portion of the bracket 15 in a fixed manner is the terminal of a tubular expansion bar 16. Pivotally secured to the other end of the portion 15' is an arm 17 and the upper end of this arm is in turn pivotally connected to the adjacent end of the expansion bar 16. By this construction the expansion bar 16 is supported in position to be subjected to the heat of the flame when the burner is lighted but not to interfere with the illuminating qualities of the flame. Mounted in the lower end of the arm 17 is a set screw 18 for a purpose that will presently appear. Mounted in the extension 13 of the valve 12 transversely of said extension is an arm 19 which has the end thereof adjacent the set screw 18 beveled as at 20 for coöperation with said set screw as will presently appear. The end of the arm 19 remote from the set screw 18 has secured thereto one end of a spring 21, the other end of this spring being suitably anchored to the lower end of the bracket 15. By this instruction it will be apparent that the spring 21 constantly tends to hold the valve 12 in closed position.

In the operation of the device it will be apparent that when the burner is unlighted the parts will be disposed in the position shown in Fig. 1. If it is desired to light the burner it is only necessary to rotate the valve 12 to open position through the medium of a pull chain 22 secured to the end of the arm 19 remote from the screw 18. The burner is then lighted and the valve 12 still held in open position by means of the chain 22. The heat of the flame will then rapidly expand the bar 16 longitudinally with the result that the arm 17 is rocked on its pivot and the screw 18 moved into engagement with the beveled end 20 of the arm 19 thus locking the valve 12 in open position against the influence of the spring 21. Should the flame of the burner be extinguished from any cause the bar 16 will rapidly contract and rock the arm 17 on its pivot in a direction to disengage the screw 18 from the end of the arm 19 when the spring 21 will immediately act to close the valve 12 and shut off the flow of gas.

In the modified form of the invention shown in Figs. 6, 7 and 8 the arm 17 is provided with a lateral extension 23. Pivoted to the central portion of the portion 15' is one end of an arm 24 the free end of which is adapted for coöperation with the adjacent end of the arm 19 which is beveled as at 26.

In the operation of the modified form of the invention it will be apparent that when the valve 12 is opened by pulling down on the chain 22 the free end of the arm 24 will engage over the adjacent end of the arm 19 and thus lock the valve against movement to closed position. As soon as the burner is lighted the bar 16 will expand and rock the arm 17 on its pivot so that the extension 23 will engage and move the arm 24 out of engagement with the arm 19 and at the same time move the screw 18 into engagement with the arm 19 whereby the valve 12 is still held in open position by the screw 18. Upon the flame of the burner being extinguished the various parts will return to the position shown in Fig. 6 as will be obvious thus automatically cutting off the flow of gas.

It will be noted that the bracket 15 consists of alined ring portions 27 and 28 which are mutually connected by a bar 29. These ring portions are disposed in embracing relation to the burner and the bar 29 is extended to form the U-shaped portion 15'.

What is claimed is:—

In an automatic gas cut off, the combination of a burner, a valve carried by the burner for controlling the flow of gas therethrough, a cross arm carried by said valve, spring means constantly tending to move said valve to closed position, a frame mounted on the burner, an expansion bar having one end pivoted to the frame, an arm pivoted to the frame having a central curved portion directed toward the burner, a V-shaped member having one arm pivoted on the frame and the end of said arm pivotally connected to the other end of said expansion bar, the apex of said member being adapted when the member is moved under the influence of the expansion bar to engage the central curved portion of the first named arm and disengage the latter from the cross arm of the valve, and a set screw carried by the other arm of the V-shaped member adapted to engage the adjacent end of the cross arm to lock the valve opened upon expansion of said bar and to move out of engagement with said cross arm upon contraction of the bar to release the valve for movement to closed position.

In testimony whereof, I affix my signature, in the presence of two witnesses.

BERNARD FRIEDMAN.

Witnesses:
W. HEADDEN,
HARRY BRASKER.

Copies of this patent may be obtained for five cents each, by addressing the "Commissioner of Patents, Washington, D. C."